United States Patent [19]

Conlon, Jr.

[11] 4,170,175

[45] Oct. 9, 1979

[54] BELT TRACKING SYSTEM

[75] Inventor: Bartholomew F. Conlon, Jr., Waynesboro, Va.

[73] Assignee: General Electric Company, Waynesboro, Va.

[21] Appl. No.: 889,890

[22] Filed: Mar. 24, 1978

[51] Int. Cl.[2] .................... B65H 23/16; B65H 23/26; F16H 7/18

[52] U.S. Cl. .................... 101/1; 74/241; 101/DIG. 13; 118/257; 198/806; 226/198; 346/74.1; 355/3 BE; 400/619

[58] Field of Search .................... 400/248, 579, 619; 74/241; 198/806; 226/190, 196, 198; 118/257; 101/1, 111, DIG. 13, 93.13; 355/3 BE; 346/74.1

[56] References Cited

U.S. PATENT DOCUMENTS

| | | | |
|---|---|---|---|
| 169,573 | 11/1875 | Parr | 74/241 |
| 218,030 | 7/1879 | Jaeger | 74/241 |
| 373,389 | 11/1887 | Creager | 198/824 |
| 783,166 | 2/1905 | Andersen | 74/241 |
| 2,095,733 | 10/1937 | Coryell | 226/196 |
| 2,655,252 | 10/1953 | Spurgeon | 198/202 |
| 3,283,981 | 11/1966 | Allen | 226/190 |
| 3,308,929 | 3/1967 | Shriver | 198/202 |
| 3,360,173 | 12/1967 | Miller | 226/196 |
| 3,435,693 | 4/1969 | Wright | 74/241 |
| 3,500,694 | 3/1970 | Jones | 74/241 |
| 3,518,739 | 7/1970 | Butler | 74/241 |
| 3,572,601 | 3/1971 | Miller | 400/579 |
| 3,665,850 | 5/1972 | Berger | 101/93.13 |
| 3,715,027 | 2/1973 | Fujimoto | 198/184 |
| 3,776,442 | 12/1973 | Ridley | 226/198 |
| 3,796,488 | 3/1974 | Tanaka | 355/16 |
| 3,818,391 | 6/1974 | Jordon | 355/3 R |
| 3,965,765 | 6/1976 | Vaillette | 74/241 |
| 3,974,952 | 8/1976 | Swanke | 226/196 |
| 3,993,186 | 11/1976 | Sokolowski | 198/806 |

FOREIGN PATENT DOCUMENTS

| | | | |
|---|---|---|---|
| 502640 | 7/1930 | Fed. Rep. of Germany | 198/806 |
| 165997 | of 1965 | U.S.S.R. | 118/257 |

*Primary Examiner*—Clyde I. Coughenour
*Attorney, Agent, or Firm*—Michael Masnik

[57] ABSTRACT

A system for tracking an endless image copying or recording belt and maintaining it in alignment within a confined area includes at least three rollers with four rollers being preferred. The first roller is a cylindrical drive roller and the second and third rollers are cylindrical driven rollers. The fourth roller is cylindrical along a major central portion and flares outwardly at the end portions. The third roller is mounted on support arms which, in turn, are mounted to pivot about the axis of the second roller and are biased normally to maintain uniform tension in the belt. If the belt creeps toward one end of the flared roller, the climb to the larger diameter displaces the tape which causes the corresponding end of the third roller to dip thereby causing the belt to move laterally back toward a central position.

8 Claims, 4 Drawing Figures

BELT TRACKING SYSTEM

BACKGROUND OF THE INVENTION

This invention relates to image copying or recording devices, and more particularly, this invention relates to a system for tracking and maintaining alignment of an endless belt in an image copying or recording device.

There are presently known a variety of recording devices such as image copiers or printers utilizing an endless belt, in the form of a web or tape of latent image storing material wherein the latent image is created on the belt and "developed" by applying a toner thereto. The toner developed image is transferred to a suitable substrate such as paper and then rendered permanent by various techniques. Such devices employ electrostatic, magnetic, etc., principles.

One of the major problems experienced in operating these devices is that of tracking of the belt. Typically, the belt is supported by at least two rollers, one of which is a drive roller, which moves the belt at a constant speed in the desired direction of travel. For a variety of reasons, the belt frequently "walks" or creeps to one end or the other of the rollers thereby resulting in misalignment or even escape from the roller. Consequently, there have been many suggestions for maintaining the belt in alignment to prevent creep. Some of these prior attempts at maintaining tracking of the endless belt involve the use of crowns, grooves, helixes, or other surface distortions of one or more rollers as described in U.S. Pat. No. 3,308,929. Other proposed solutions to the problem involve the use of sensors for detecting lateral movement of the belt beyond a predetermined amount with means for tilting rollers or roller assemblies then being activated responsive to a signal from the sensor. A typical such construction is shown in U.S. Pat. No. 3,818,391. Other constructions involving edge sensing of the web and consequent movement of a carriage containing one or more rollers are shown in U.S. Pat. Nos. 3,715,027, 3,796,488 and 3,993,186.

The aforementioned prior art constructions suffer from disadvantages. They result in excessive belt wear, require frequent maintenance and adjustment or involve complex elements which are, themselves, subject to malfunction.

SUMMARY OF THE INVENTION

It is, therefore, the primary object of the present invention to provide an improved system for tracking an endless belt which is free of the aforementioned disadvantages.

It is another object of the present invention to provide an improved device for tracking an endless belt and maintaining the same in alignment.

It is a further object of the present invention to provide a system for tracking an endless image recording belt which is simple in construction and less susceptible to malfunction than prior art systems.

It is yet another object of the present invention to provide a system for tracking an endless image recording belt which does not subject the belt to undue wear.

It is still a further object of the present invention to provide an image recording machine of the type using an endless belt of recording material which automatically compensates for creep of the endless belt.

Consistent with the foregoing objects, a system is provided for tracking an endless image recording belt and maintaining the same in alignment comprising at least three rollers supporting the belt, one of the rollers being a substantially cylindrical drive roller, the second of the rollers being substantially cylindrical over a central major portion thereof approximately corresponding to the width of the belt and flaring outwardly with increasing diameter at either end thereof, the third of the rollers being substantially cylindrical and rotationally mounted at each end thereof in one end of a support arm, the support arms having a roller other than the second roller rotationally mounted at the other end thereof, and itself, being arranged to pivot about an axis coincident with the axis of the other roller and being biased such as to maintain uniform tension in the belt and to maintain all of the rollers normally substantially parallel to each other. Consequently, if the belt creeps laterally toward one end of the flared roller its edge closest to that end will climb to a larger diameter thereby pulling inwardly on the corresponding end of the third roller. Due to the consequent pivotal movement of the corresponding support arm causing the third roller to tilt out of parallelism, the belt will move laterally toward the other end of the rollers until it is again centered and the parallelism of the rollers is restored whereupon lateral movement of the belt will stop.

In a preferred embodiment involving a magnetic printer, four rollers are used, the first being the drive roller, the second being an idler roller with flared ends, and the third and fourth being idler rollers.

BRIEF DESCRIPTION OF THE DRAWINGS

The invention will be better understood and objects other than those set forth above will become apparent when consideration is given to the following detailed description thereof which makes reference to the annexed drawings wherein.

DETAILED DESCRIPTION OF THE PREFERRED EMBODIMENT

Figure 1:
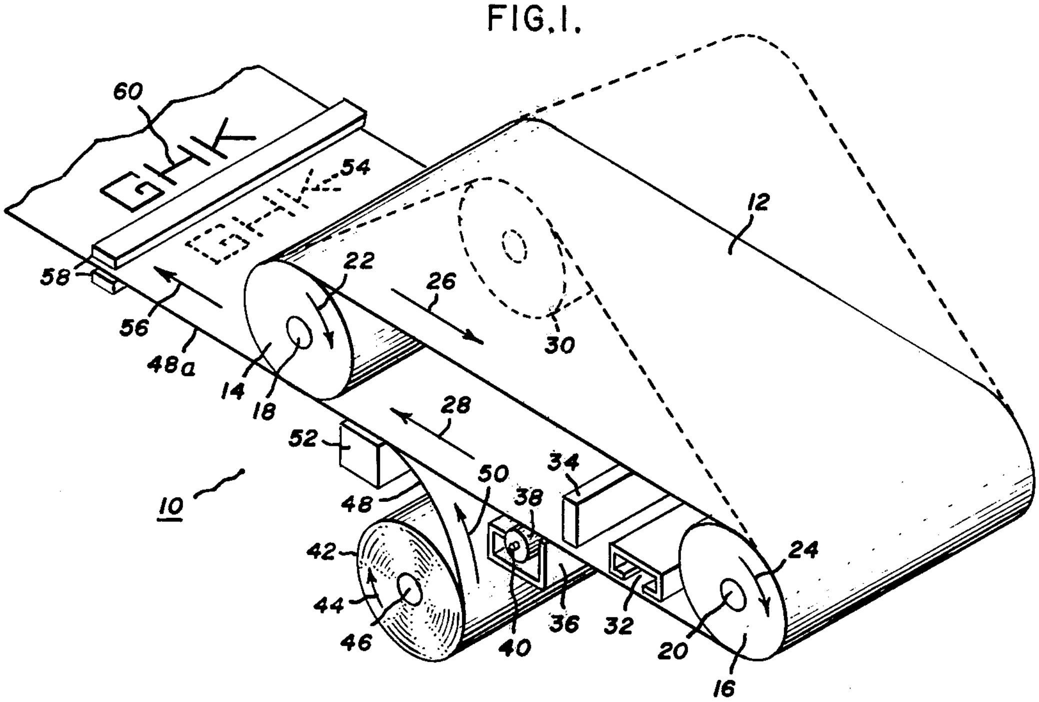
FIG. 1 is a perspective view of a typical magnetic printer showing the placement of the various components thereof.

Referring first to FIG. 1, there is shown a high speed magnetic printer generally designated by the numeral 10 and having an endless belt 12 of the magnetizable material. Such a belt comprises magnetic particles having a remanence deposited on a web of a plastic material. Endless belt 12 is supported by a pair of rollers 14 and 16, one of which is a drive roller and the other is a driven, or idler roller, the rollers being driven in a manner well known in the art. Rollers 14 and 16 are supported on shafts 18 and 20, respectively. Shafts 18 and 20 are suitably mounted in the bearings or other support structure (not shown) well known in the art with the shaft of the drive roller being operatively connected to drive means such as a motor. The rollers are driven in the direction of arrows 22 and 24. Since rollers 14 and 16 are biased apart a sufficient distance to frictionally engage the interior surface of endless belt 12, the belt is continuously driven in the direction of arrows 26 and 28.

As an alternative embodiment of a typical construction, a third roller 30 can be provided with belt 12 traversing all three rollers as shown in dotted lines. The three roller construction is essentially that shown in FIG. 1 of the aforementioned U.S. Pat. No. 3,818,391. Similarly, more than three rollers could be used.

As endless belt 12 is rotated, it passes adjacent to erase means 32 which premagnetizes (or demagnetizes) all particles of the recording medium in a uniform direction to remove previous information therefrom. The premagnetized recording medium then moves past printing head 34 which generates an array of magnetic fields having sufficient strength to switch the magnetic orientation of the premagnetized recording medium in each of a plurality of small areas. Recording head 34 is connected to a source of recording signals (not shown). Belt 12 then continues past magnetic brush means 36 having a roller 38 rotating about a fixed axis 40 for transferring toner to the latent images produced on belt 12 by recording head 34. Belt 12 passing beyond magnetic brush means 36 thereby carries indicia-shaped deposits of toner on the lower surface thereof. Details of the recording process and structures are well known in the art and need not be discussed in greater detail.

A roll of paper or similar hard copy medium 42 rotates in the direction of arrow 44 about a driven shaft 46 thereby feeding a continuous single sheet 48 in the direction of arrow 50 to travel adjacent the lower surface of belt 12. Belt 12 and sheet 48 pass over transfer means 52 which exerts an energy field transferring the toner from belt 12 to the upper surface of sheet 48. Portion **48*a* of sheet 48 bearing developed image deposits 54 of toner continues moving in the direction of arrow 56 to pass between fixing means 58 which permanently affix the toner particles to the sheet. Fixing means 58** may use temperature, pressure, or like applications for fixing the toner to the sheet.

A similar series of steps is conducted by the device illustrated in FIG. 1 of the aforementioned U.S. Pat. No. 3,818,391 wherein the photoconductive belt is exposed, transported to a developing station wherein toner is applied by means of magnetic brushes, transported to a transfer station where a sheet of copy paper is superimposed onto the belt and the developed image is transferred thereto. The sheet is then stripped from the belt and passed to a fuser where the toner is permanently fixed to the paper sheet.

Typically, the sheet of paper has a width in the order of fourteen inches and the endless belt 12, therefore, also has a width of about fourteen inches. Thus, it will be appreciated that for sake of compactness the span between rollers is very small compared to the width of the belt which, typically, comprises a short substrate of extremely thin plastic with relatively no edge stiffness. Because of the short length, the ordinary belt guiding devices such as crowned rollers will not work since there is not enough stretch in a short belt for sufficient contact pressure between the roller and belt ends to make a tracking correction. Conversely, if there is adequate belt tension at the ends of the belt, there is excessive tension in the middle when using a crowned roller. Because of the lack of edge stiffness in the plastic film, ordinary belt guiding devices such as guide pins, pulley shoulders, etc., will not work because the film edge will collapse. The use of other configurations of roller surface such as recesses or grooves also is unsatisfactory due to the short distance between rollers and the need for a perfectly flat belt surface at the erase and record stations.

Figure 2:
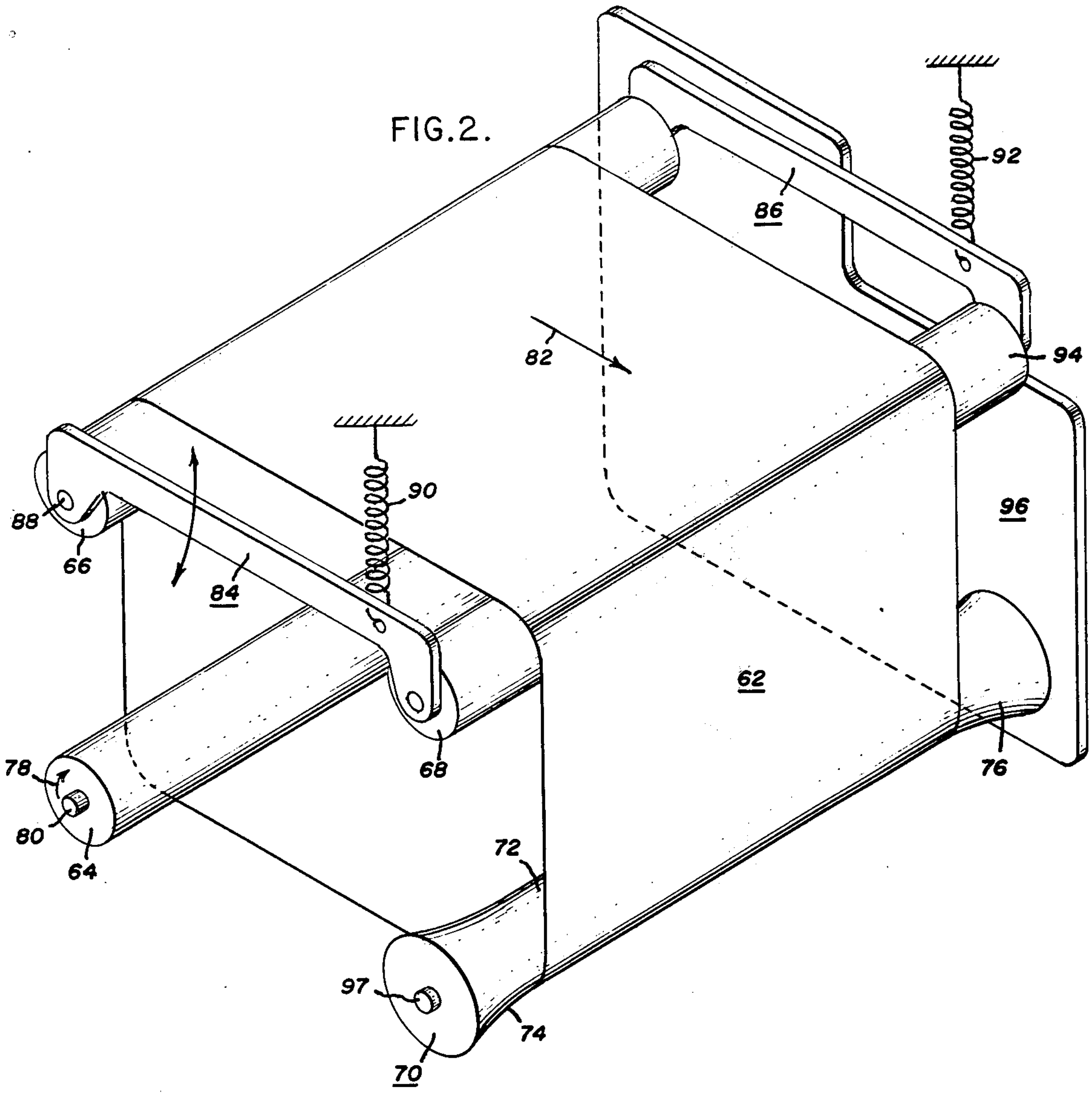
FIG. 2 is a perspective view of the preferred embodiment of the system of the present invention.

Attention is now directed to FIG. 2 wherein belt 62 is shown riding on four rollers 64, 66, 68 and 70. Rollers 64, 66 and 68 are essentially cylindrical and roller 70 has central cylindrical portion 72 constituting the major part of its length with flared end portions 74 and 76. Roller 64 is depicted as the drive roller rotating in the direction of arrow 78 around shaft 80 which is driven by well known means (not shown) such as a motor. When drive roller 64 is rotating, belt 62 moves in the direction of arrow 82.

Figure 3:
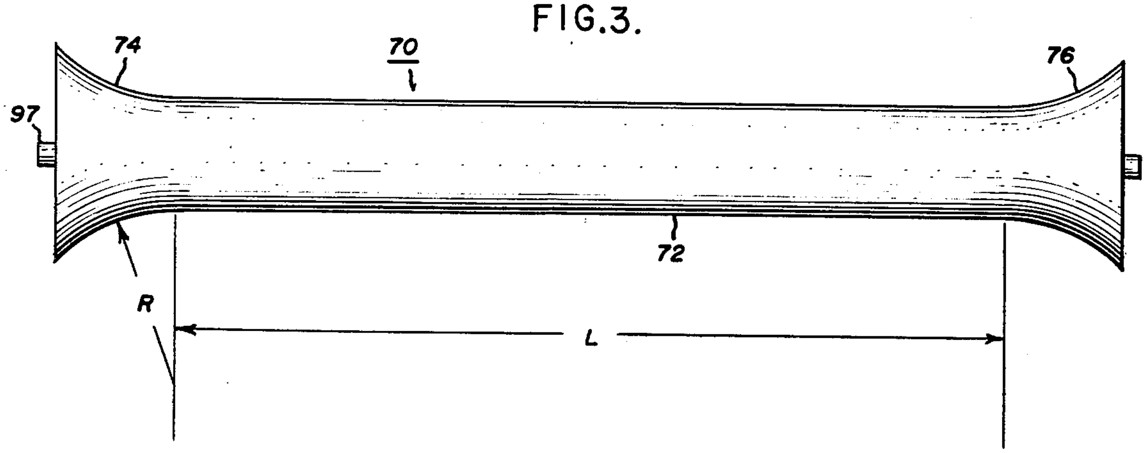
FIG. 3 is a front elevational view of the flared roller used in the system of the present invention.

Referring to FIG. 3, roller 70 comprises cylindrical central portion 72 and flared end portions 74 and 76 rotating about shaft 97. The length L of central cylindrical portion 72 is substantially the same as the width of belt 62. End portions 74 and 76 flare outwardly in a curve to an increasing diameter at a smooth rate. In one embodiment the length L of central cylindrical portion 72 was equal to the width of the tape and the diameter of the flared portions 74 and 76 increased smoothly at a given radius R of 25 inches resulting in approximately one-sixteenth of an inch diameter increase in the ends of the roller 72.

Returning to FIG. 2, support arms 84 and 86 are journalled to accept shaft 88 of roller 66 so that support arms 84 and 86 are free to pivot about the axis of shaft 88 as indicated by the arrows. Support arms 84 and 86 are biased at the ends opposite shaft 88 by low gradient springs 90 and 92. Rollers 64, 66 and 68 and central portion 72 of roller 70 are parallel to each other when belt 62 is on the rollers and in the proper position. Support arms 84 and 86 are independent of each other. Also, roller 68 is above roller 70. The shafts of rollers 64, 70 and 66 are mounted for rotation in bearings carried in side frames 96 located at both ends of the rollers. Only one frame is shown for simplicity.

In operation, when belt 62 is properly centered and aligned, all four rollers are parallel and no lateral correction is necessary. But, if belt 62 creeps to one end of roller 70, end 76, for instance, the edge of tape 62 will climb to a larger diameter up the flare of end portion 76. When this happens, since the tape 62 is stiffer than spring 92, roller 68 will tilt down at end portion 94 toward roller 70 thereby causing a lack of parallelism between roller 68 and the other rollers. This action can be visualized as the tilting down of roller 68 at end 94 making the overall configuration of the rollers seem like a conic section insofar as belt 62 is concerned. Because of the belt's lateral stiffness, it begins to climb towards the larger diameter as would a tape being wrapped on a cone. As the tape "walks" back toward the centered position, support arm 86 will return to its original position, thereby restoring the parallelism.

Figure 4:
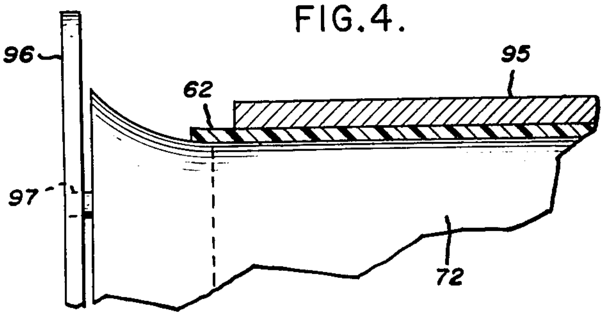
FIG. 4 is a front elevational view showing the flared roller, tape and recording head as used in a compound correction feature.

In another embodiment, shown in FIG. 4, a compound correction can be obtained by having central cylindrical portions 72 of roller 70 somewhat smaller in length than the width of belt 62 and having both edges of the belt outside of the reproduction area defined by recording head 95 run on the initial part of the flared portions 74 and 76 of FIG. 3 at all times. The beginning of the flared portion is identified by dotted line. An initial excursion from the centered position then causes one support arm, say support arm 84 of FIG. 2, to dip or collapse while the other support arm, say support arm 86 of FIG. 2, rises or expands, thereby inducing a compound correction which tends to maintain the belt very close to the center of the roller. The important criterion for a satisfactory centralizing operation is that the radius of the increasing diameter flared roller should be greater than the non-parallelism of the fixed rollers plus the taper that may exist in the belt over its length due, for example, to the perimeter or edges of the belt being unequal in size. This criterion is equally valid in the aforementioned embodiment.

As already discussed, this system is operable in a construction having at least three rollers with the preferred embodiment using four rollers. It will work, however, on a system having any greater number of rollers.

Thus, it can be seen that the objects set forth at the beginning of the specification have been successfully achieved. Since many embodiments may be made of the instant inventive concepts, and many modifications may be made of the embodiments hereinbefore described, it is to be understood that all matter herein is to be interpreted merely as illustrative and not in a limiting sense.

What I claim as new and desire to secure by Letters Patent of the United States is:

1. A system for driving an endless belt within a confined area, comprising a system of rollers supporting said belt, a first of said rollers being a substantially cylindrical drive roller, a second of said rollers being substantially cylindrical over a central major portion thereof substantially corresponding to the width of said belt and flaring outwardly with increasing diameter at each end thereof, said first and second rollers being mounted to rotate about fixed parallel axes, a third of said rollers being rotationally mounted at each end thereof in one end of a respective support arm, said support arms being arranged to pivot about an axis parallel to said fixed parallel axes and being biased such as to maintain uniform tension in said belt and to maintain all of said axes normally substantially parallel to each other, said flared roller and said support arms operative when said belt creeps toward one end of said flared roller to cause the belt edge closest to that end to climb to a larger diameter of said flared roller thereby pulling inwardly on the corresponding end of said third roller and, due to the consequent pivotal movement of the corresponding support arm, causing said third roller to tilt out of parallelism which, in turn, causes said belt to move laterally toward the other end of said rollers until said belt is again centered and the parallelism of said rollers is restored.

2. A system as described in claim 1 wherein the flaring of said second roller is curved and the radius of curvature of said flaring is greater than any non-parallelism of the fixed rollers plus any taper or irregularity that may exist in the belt over its length due to, for example, the perimeter or edges of the two ends of the belt being unequal in size.

3. A system as defined in claim 1 wherein said support arms pivot about a roller have an axis of rotation coincident with said pivot axis.

4. A system as defined in claim 1 wherein the cylindrical portion of said third roller is slightly shorter than the width of said belt, whereby said belt normally rides on a portion of said flared end portions, lateral movement of said belt toward one end of said flared roller causing the corresponding end of said third roller to dip toward said flared roller and the other end of said third roller to move away from said flared roller thereby causing compound correction.

5. A magnetic printer comprising an endless belt of magnetizable material, means for erasing previously recorded information from said belt, means for recording information on said belt to form a latent image, means for applying toner to said belt to develop said latent image, means for transferring said toner to a substrate to transfer said image to said substrate, means to fix said image to said substrate, at least three rollers supporting said belt, one of said rollers being a substantially cylindrical drive roller, a second of said rollers being substantially cylindrical over a central major portion thereof substantially corresponding to the width of said belt and flaring outwardly with increasing diameter at each end thereof, a third of said rollers being substantially cylindrical and rotationally mounted at each end thereof in one end of a respective support arm, said support arms having a fourth roller rotationally mounted at the other end thereof and, itself, being arranged to pivot about an axis coincident with the axis of said fourth roller and being biased such as to maintain uniform tension in said belt and to maintain all of said rollers normally substantially parallel to each other, said flared roller and its associated support arms operative when said belt creeps toward one end of said flared roller to cause the belt edge closest to that end to climb to a larger diameter of said flared roller, thereby pulling inwardly on the corresponding end of said third roller and, due to the consequent pivotal movement of the corresponding support arm, causing said third roller to tilt out of parallelism which, in turn, causes said belt to move toward the other end of said rollers until said belt is again centered and the parallelism of said rollers is restored.

6. A magnetic printer as defined in claim 5 wherein the cylindrical portion of said third roller is slightly shorter than the width of said belt, whereby said belt normally rides on a portion of said flared end portions and lateral movement of said belt toward one end of said flared roller causes the corresponding end of said third roller to dip toward said flared roller and the other end of said third roller to move away from said flared roller thereby causing compound correction.

7. A magnetic printer as deinfed by claim 5 wherein said erase means and record means are located within the loop formed by said endless belt and in close proximity to the inner surface of said belt, and said toner applying means is located outside said loop and in close proximity to the outer surface of said belt.

8. A magnetic printer as defined in claim 7 wherein said toner applying means comprises magnetic brush means.

* * * * *